May 26, 1970   J. D. McGHEE ET AL   3,514,209
DEVICE FOR MEASURING THE MAXIMUM INTENSITY OF A PULSE OF ENERGY
Filed Feb. 9, 1968

INVENTORS
JOHN D. McGHEE,
RAYMOND W. TABELING,
BY Robert A. Lesti
AGENT

United States Patent Office 3,514,209
Patented May 26, 1970

3,514,209
DEVICE FOR MEASURING THE MAXIMUM INTENSITY OF A PULSE OF ENERGY
John D. McGhee, Plymouth Meeting, Pa., and Raymond W. Tabeling, Wilmington, Del., assignors to E. I. du Pont de Nemours and Company, Wilmington, Del., a corporation of Delaware
Filed Feb. 9, 1968, Ser. No. 704,445
Int. Cl. H01j *39/12;* G01j *1/42, 1/44*
U.S. Cl. 356—224                           12 Claims

ABSTRACT OF THE DISCLOSURE

A device employed to measure the maximum intensity of a pulse of energy, e.g., a pulse of light produced by a Chemiluminescent reaction, comprising, preferably, a photomultiplier tube which produces a dark current and a current proportional to the incident light, a variable-resistance filter connected to the output of the photomultiplier tube, an operational amplifier connected to the filter, an automatic range changing circuit coupled in feedback relation across the operational amplifier adapted to attenuate stepwise the voltage output of the amplifier as the current input to the amplifier increases, range lights connected to the range changing circuit for indicating the range of the output of the amplifier, an automatic dark current compensating circuit coupled in feedback relation across the amplifier for suppressing the effect of the dark current at the output of the amplifier, a capacitor connected to the output of the amplifier adapted to hold a bias representative of the voltage output of the amplifier, and an indicating means, digital or analog, for indicating the magnitude of the bias on the capacitor.

CROSS REFERENCES TO RELATED APPLICATIONS

This invention is related to the subject matter of U.S. application Ser. No 704,442, filed on the same day, entitled Dark Current Compensating Circuit by the same inventors, in that the electrical circuit described therein can be used to suppress the effect of dark current produced by a photomultiplier tube. The electrical circuit described in U.S. application Ser. No. 704,444, filed on the same day, entitled Voltage Supply by inventor John D. McGhee, can be employed in the present invention to supply a photomultiplier tube with a stabilized D.C. voltage. A detailed description of an electrical circuit suitable for attenuating stepwise the output of an amplifier is provided by U.S. application Ser. No. 704,444, filed on the same day entitled Automatic Range Changing Circuit by inventor John D. McGhee. One analytical determination to which the present invention can be applied is disclosed in U.S. Ser. No. 635,109, filed May 1, 1967, entitled Method for Determining Bacterial Populations by inventor Anthony J. D'Eustachio.

It is often desirable to measure the maximum intensity of a pulse of energy. For example, the amount of adenosine triphosphate present in a given sample can be conveniently determined by measuring the maximum intensity of the light generated by reacting the adenosine triphosphate with luciferin, luciferase, a cation (usually $Mg^{++}$) and oxygen as discussed in application Ser. No. 635,109, filed May 1, 1967, entitled Method for Determining Bacterial Populations by inventor Anthony J. D'Eustachio.

The present invention is a device for measuring the maximum intensity of a pulse of energy comprising transducive means for producing an electrical signal proportional to said energy, amplifying means connected to said transducive means for amplifying said electrical signal, range changing means coupled in feedback relation to said amplifying means adapted to automatically attenuate the amplified signal a predetermined amount whenever said amplified signal reaches at least one predetermined value in response to said pulse of energy, first indicating means connected to said range changing means to indicate whenever said amplified signal reaches said at least one predetermined value, and second indicating means coupled to said amplifying means for indicating the magnitude of said amplified signal.

For a better understanding of the invention reference is made to the following detailed description of the invention and the attendant drawings wherein.

Figure 1:
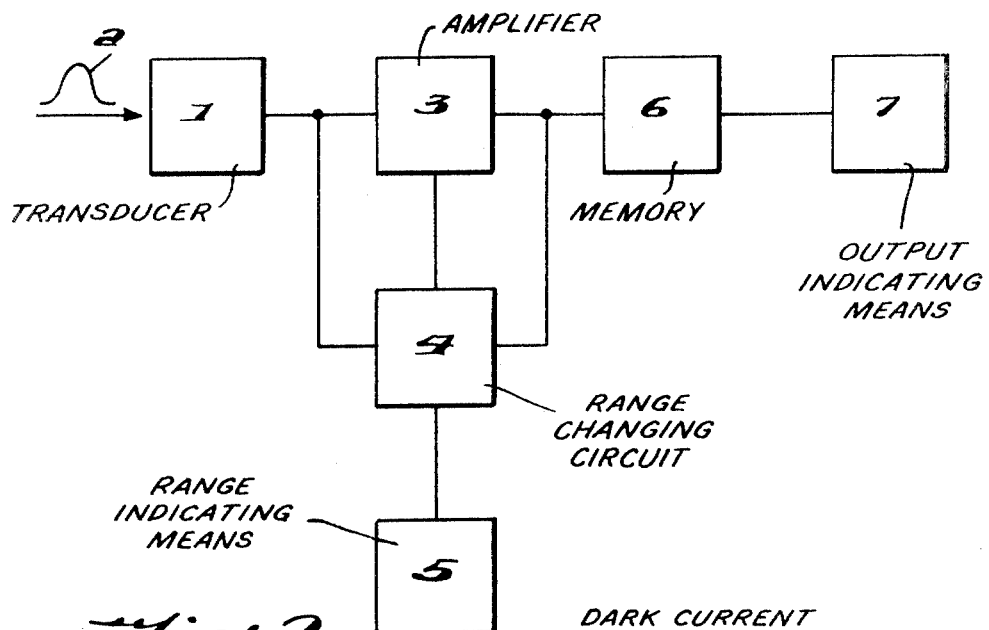
FIG. 1 represents one embodiment of the invention.

Referring to FIG. 1, transducer 1 converts energy pulse 2 to a proportional electrical signal. This signal is then amplified by amplifier 3 having range changing circuit 4 coupled between its output and input. As the electrical signal supplied to amplifier 3 increases, range changing circuit 4 automatically attenuates stepwise the output of the amplifier, preferably by powers of ten, each time the output reaches a predetermined value. The degree of attenuation is indicated by indicating means 5 connected to range changing circuit 4 in a representative manner. Memory 6, coupled to the output of amplifier 3, retains the maximum amplitude of the amplifier output after the last attenuation. This value is then sensed and displayed by indicating means 7 which can be, for example, a voltmeter or a digital counter.

Figure 2:
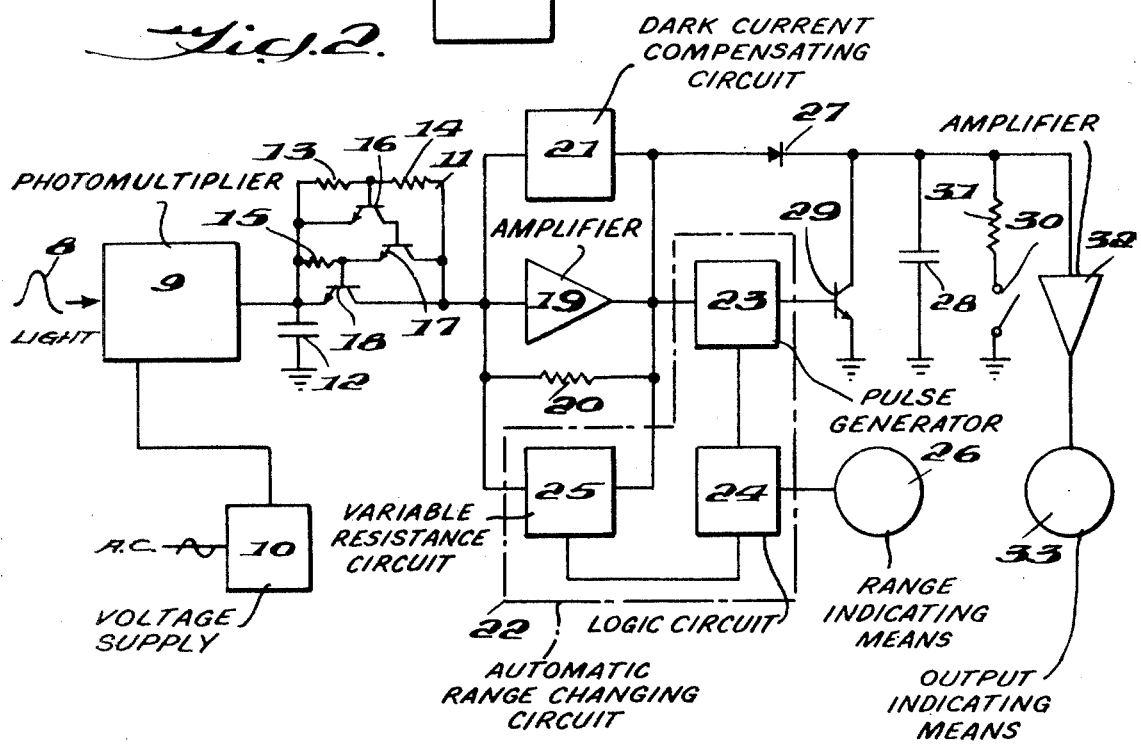
FIG. 2 illustrates a preferred embodiment of the invention.

In the preferred embodiment of FIGURE 2, the present invention is employed to measure the peak of a pulse of light. This device is particularly suitable for measuring light emitted by chemiluminescent reactions. Light pulse 8 is conveniently illustrated as a smooth, symmetrical pulse of light. For a chemiluminescent reaction, the pulse of light would generally have a short rise time with an exponential decay. In addition, since light is produced by the emission of photons, the light pulse actually comprises a number of sharp spikes which when averaged form a smooth curve. Photomultiplier tube 9 is positioned such that light pulse 8 impinges upon its photocathode. As well known in the art, a typical photomultiplier tube consists of a photocathode which emits an electron for each photon impinging upon its surface, a series of dynodes which multiply this "electron current," and finally an anode coupled to load which receives the generated current. In this embodiment the dynodes are biased by high, negative D.C. potential provided by voltage supply 10 which is preferably plugged into an ordinary A.C. outlet. One voltage supply which can be incorporated in the present invention is described in U.S. application S.N. 704,442, filed on the same day, entitled Voltage Supply by inventor John D. McGhee.

The anode current or output of photomultiplier tube 9 includes a dark current component and a component that is directly proportional to the light incident upon the photocathode. It must be emphasized that a photomultiplier tube functions as a current source. Its output is therefore substantially independent of load impedance. To obtain a smooth pulse shaped current, the anode of photomultiplier tube 9 is connected to filter 11, which consists of grounded capacitor 12, resistors 13, 14 and 15 and transistors 16, 17 and 18. At low current levels, the anode current flows from photomultiplier tube 9 via resistors 13 and 14 to the input of amplifier 19. As the current increases, transistor 16 turns on shunting resistor 13, thereby decreasing the resistance of filter 11. With a further increase in current, transistor 17 and finally transistor 18 turn on, shunting, respectively, resistors 14 and 15.

The overall effect is to decrease the resistance with increasing current while maintaining the desirable filtering action. Thus, the problem of developing a high voltage drop across filter 11 at high current levels is eliminated.

Amplifier 19 is preferably an operational amplifier having resistor 20 coupled across its terminals. Because of the large gain of a typical operational amplifier, the input to amplifier 19 is at or near ground. Therefore, the voltage at the output of amplifier 19 is equal to the generated anode current times the resistance of resistor 20.

The effect of the aforementioned dark current is eliminated by an appropriate feedback through dark current compensating resistor 21. A description of a suitable dark current compensating circuit can be found in U.S. application S.N. 704,443, filed on the same day, entitled Dark Current Compensating Circuit by the same inventors. Briefly, in the absence of light impinging upon photomultiplier tube 9, the output of amplifier 19 is sensed by dark current compensating circuit 21. An appropriate feedback current is then provided by the circuit to the input of amplifier thereby zeroing the output voltage to the input level. When photomultiplier tube 9 is subjected to light pulse 8, dark current compensating circuit 21 is adapted to continue to feedback the same current as before. Thus, the voltage at the output of amplifier is directly proportional to light pulse 8 (in its smoothed form).

Since a number of light pulses 8 can have a large variation in peak amplitudes, it is desirable to provide a plurality of ranges by attenuating the output of amplifier 19 stepwise as the anode current of photomultiplier tube 9 increases. This is accomplished by connecting between the input and output of amplifier 19 automatic range changing circuit 22 which comprises preferably pulse generator 23, logic circuit 24 and variable-resistance circuit 25. Automatic range changing circuit 22 is preferably set to attenuate the output voltage of amplifier 19 by a power of ten each time it rises to a preset value. When this preset value is reached pulse generator 23 supplies a voltage pulse to logic circuit 24, which in turn changes the resistance of variable-resistance circuit 25. With a ten-fold decrease in the total feedback resistance across amplifier 19, its voltage output is attenuated by a power of ten. It is necessary that automatic range changing circuit 22 be reset to its initial unattenuating state prior to subjecting photomultiplier tube 9 to a light signal. The degree of attenuation is shown by indicating means 26, which can be, for example, a series of neon range lamps. A preferred automatic range changing circuit is described in U.S. application S.N. 704,444, filed on the same day, entitled Automatic Range Changing Circuit by inventor John D. McGhee.

The output of amplifier 19 also feeds through diode 27 to memory capacitor 28, which is biased to the output voltage level. Each time the aforementioned preset voltage level is reached pulse generator 23 also supplies a pulse to the base of transistor 29, which then conducts thereby discharging rapidly capacitor 28. By closing switch 30, capacitor 28, can be discharged to ground via resistor 31 prior to measuring the peak amplitude of a subsequent light pulse.

Amplifier 32 and indicating means 33 are serially-coupled to the non-grounded end of capacitor 28. Amplifier 32 preferably incorporates a field effect transistor in its initial amplifying stage. Since such a transistor draws essentially no current, the voltage bias on capacitor 28 is held while indicating means 33 provides either an analog or digital read out of the bias. In order to obtain an accurate reading, it is necessary that the present invention be properly calibrated. One suitable method for calibrating consists of subjecting photomultiplier tube 9 to a known radioactive source and adjusting voltage supply 10 until indicating means 33 gives the correct reading. In calibrating for the detection of ATP, it has been found preferable to subject photomultiplier tube 9 to a known quantity of ATP. The outputs of indicating means 26 and 33 are noted. A calibrating lamp is turned on and adjusted until the noted value is reached. With this lamp on the gain of photomultiplier tube is then adjusted upward via voltage supply 10 until the output displays the correct value for the known ATP sample.

To best describe the basic operation of the present invention it will be assumed that (1) automatic range changing means 22 is adapted to attenuate the voltage output of amplifier 19 by a power of ten each time the output reaches 10 volts, (2) automatic range changing circuit 22 is set to its initial unattenuating state, (3) resistor 20 equals 500 megohms, (4) the bias on capacitor 28 equals the voltage at the output of amplifier 19, and (5) light pulse 8 at its peak produces a proportional current in the anode circuit of photomultiplier tube 9 of 1 μa. As light pulse 8 is applied to photomultiplier tube 9, the voltage output of amplifier 19 increases. When the proportional component of the anode current reaches 20 na., the voltage at the output of amplifier 19 and consequently the bias on capacitor 28 equals 10 volts. Pulse generator 23 then sends a pulse to logic circuit 24 which decreases by a power of ten the total feedback resistance across amplifier 19 via variable-resistance circuit 25. At the same time, capacitor 28 is discharged through transistor 29 to ground. The voltage at the output and capacitor 28 (through diode 27) is now 1 volt. Indicating means 26 indicates that the output has been attenuated once. The voltage at the output of amplifier 19 next equals 10 volts when the proportional component of the anode current rises to 200 na. Again, the output is attenuated and capacitor 28 discharged to one volt. Finally, when the proportional component of the anode current reaches its peak of 1 μa. the voltage at the output of amplifier 19 and capacitor 28 equals 5 volts. This value is sensed and displayed by indicating means 33. To obtain the actual reading, the value shown by indicating 33 is multiplied by $10^2$ as now indicated by indicating means 26.

It will be understood that various changes in the details, materials, steps, and arrangement of parts, which have been herein described and illustrated, may be made by those skilled in the art within the principle and scope of the invention as expressed in the appended claims.

We claim:

1. A device for measuring the maximum intensity of a pulse of energy comprising transducive means for producing an electrical signal proportional to said energy, amplifying means connected to said transducive means for amplifying said electrical signal, range changing means coupled in feedback relation to said amplifying means adapted to automatically attenuate the amplified signal a predetermined amount whenever said amplified signal reaches at least one predetermined value in response to said pulse of energy, first indicating means connected to said range changing means to indicate whenever said amplified signal reaches said at least one predetermined value, memory means coupled to said amplifying means and adapted to retain the maximum amplitude of said amplified signal after the last attenuation of said amplified signal, and second indicating means coupled to said memory means for indicating the maximum amplitude of said amplified signal.

2. The device of claim 1 further comprising compensating means coupled to said amplifying means for suppressing the dark current contribution to the electrical signal.

3. The device of claim 2 wherein said compensating means is coupled in feedback relation to said amplifying means.

4. The device of claim 1 wherein said transducive means provides a direct current proportional to said energy, said current being substantially independent of load impedance.

5. The device of claim 4 further comprising a filter, positioned between said transducive means and said amplifying means, adapted to smooth the direct current output of said transducive means.

6. The device of claim 1 wherein said transducive means is a photomultiplier tube and said amplifying means is an operational amplifier.

7. The device of claim 6 further comprising a filter, adapted to smooth the direct current output of said photomultiplier tube, coupled between said photomultiplier tube and said operational amplifier and further comprising a compensating means coupled in feedback relation across said operational amplifier for suppressing the effect of the dark current contribution to the direct current output of said photomultiplier tube.

8. The device of claim 7 wherein said filter is adapted to decrease in resistance as the direct current output of said photomultiplier tube increases, thereby preventing a high voltage drop from developing across said filter.

9. The device of claim 8 wherein said filter comprises a capacitor having one end coupled to said photomultiplier tube and the other end coupled to ground, a plurality of serially-connected resistors coupled between the non-grounded end of said capacitor and said operational amplifier, and a plurality of transistors connected across said resistors adapted to progressively shunt said resistors as the direct current output of said photomultiplier tube increases.

10. The device of claim 8 wherein said memory means is a capacitor which is adapted to be charged as the voltage output of said operational amplifier increases and adapted to be discharged rapidly whenever the output voltage of said operational amplifier is attenuated.

11. The device of claim 10 wherein said second indicating means comprises field effect transistor amplifier and a voltmeter coupled to the output of said field-effect-transistor amplifier.

12. The device of claim 10 wherein said second indicating means comprises a field-effect-transistor amplifier and a digital counter coupled to the output of said field-effect-transistor amplifier.

References Cited

UNITED STATES PATENTS

| | | | |
|---|---|---|---|
| 3,187,323 | 6/1965 | Flood et al. | 324—115 X |
| 3,237,102 | 2/1966 | Newell | 324—115 |

RALPH G. NILSON, Primary Examiner

T. N. GRIGSBY, Assistant Examiner

U.S. Cl. X.R.

250—207, 214; 324—116; 356—226